Figure 2:
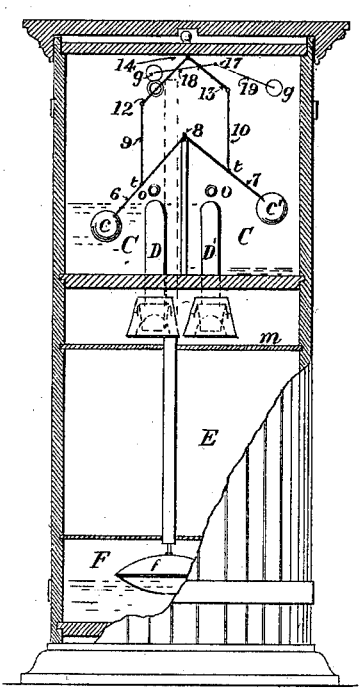

No. 719,357. PATENTED JAN. 27, 1903.
J. N. McCLINTOCK.
APPARATUS FOR THE PURIFICATION OF WATER OR SEWAGE.
APPLICATION FILED MAR. 25, 1902.
NO MODEL. 2 SHEETS—SHEET 1.

WITNESSES:
C. H. Gannett
M. F. Herring

INVENTOR.
John N. McClintock
BY
Geo. Carter Chancy,
ATTORNEY.

No. 719,357. PATENTED JAN. 27, 1903.
J. N. McCLINTOCK.
APPARATUS FOR THE PURIFICATION OF WATER OR SEWAGE.
APPLICATION FILED MAR. 25, 1902.
NO MODEL. 2 SHEETS—SHEET 2.

WITNESSES: INVENTOR.
C. H. Gannett John N. McClintock
M. F. Herring BY Geo. Carter Chancy
ATTORNEY.

UNITED STATES PATENT OFFICE.

JOHN N. McCLINTOCK, OF BOSTON, MASSACHUSETTS.

APPARATUS FOR THE PURIFICATION OF WATER OR SEWAGE.

SPECIFICATION forming part of Letters Patent No. 719,357, dated January 27, 1903.

Application filed March 25, 1902. Serial No. 99,922. (No model.)

*To all whom it may concern:*

Be it known that I, JOHN N. MCCLINTOCK, of Boston, in the county of Suffolk and State of Massachusetts, have invented certain new and useful Improvements in Apparatus for Purification of Water or Sewage, of which the following is a specification.

This invention relates to an apparatus for the treatment of liquids, and is particularly well adapted for the purification of water for domestic purposes and also for the purification of sewage. For this purpose I employ a receptacle or chamber for the reception of the impure water or the sewage, which will be hereinafter referred to as the "septic tank," a filter-chamber communicating therewith for the overflow from the septic tank of the impure liquid, a collecting-chamber communicating with the filtering-chamber for passage of the filtered water or the effluent after passing through the filter-bed, a valve to control the discharge from the septic tank into the filtering-chamber, and a float in the collecting-chamber operatively connected to said valve to close and open the same according to the level of the liquid in the said collecting-chamber. When the invention is embodied in an apparatus for treating water for domestic purposes, the three chambers above referred to are preferably contained in a suitable casing, which also contains a second filter-bed, preferably larger than the primary filter-bed referred to, and, further, is provided with a chamber below the secondary filter bed, in which the filtered water is collected and which contains a suitable float connected to a valve in the main or supply pipe, whereby the supply of impure water to the septic tank may be automatically controlled by the filtered or pure water in the chamber below the secondary filter-bed. The water-purifying apparatus is preferably also provided with means, as will be described, whereby the filtering apparatus may be automatically ventilated. These and other features of this invention will be pointed out in the claims at the end of this specification.

Figure 1:
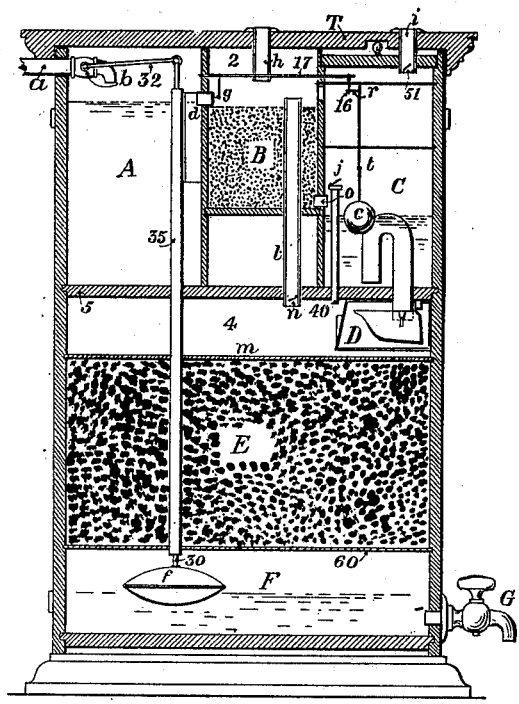
Figure 3:
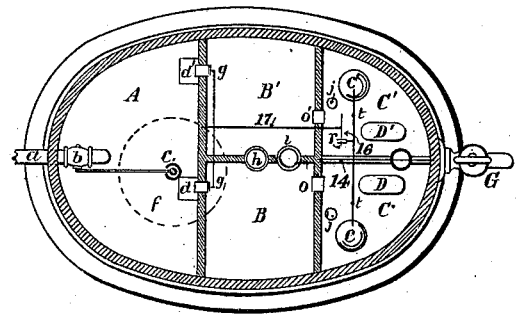

Figure 1 is a vertical section of a water-purifying apparatus embodying this invention; Fig. 2, an end or side elevation and section of the apparatus shown in Fig. 1 looking toward the left; Fig. 3, a top or plan view with the cover removed, and Fig. 4 a perspective view of a sewage-purifying apparatus embodying the invention.

In the apparatus shown in Fig. 1 the impure water is supplied through an inlet-pipe $a$ to a chamber A, constituting one form of septic tank, from which the water passes through wiers $d\ d'$ into a chamber 2, containing separate beds B B' of filtering material, such as coke, sand, &c. The filtered water passes from the filters B B' through one of two pipes $o\ o'$ into one of two collecting-tanks C C', provided with suitable siphons D D', so arranged that when the filtered water rises to the level of either siphon-pipe it discharges into an air-chamber 4, located below the partition-wall 5 and above substantially large filter-beds E, only one of which appears in Fig. 1, through which it filters slowly down into a collecting-chamber F, which is provided with a valved outlet-pipe G. The flow of water from the septic tank A is controlled by the floats $c\ c'$ in the collecting tanks or chambers C C', as will be described. The floats $c\ c'$ are attached to rigid arms 6 7, fast to a rock-shaft 8 and connected by links 9 10 to arms 12 13 of a rock-shaft 14, the arms 13 having extended from it a forked arm $r$, which engages an arm 16 on a rock-shaft 17, which is provided with two arms 18 19, carrying gates or valves $g\ g'$, coöperating with the outlet-ports of the wiers $d\ d'$. By the mechanism just described the valves $g\ g'$ are intermittently opened and closed—that is, the water from the tank A is allowed to flow onto one filter-bed, as B, until the collecting-tank C has been filled to the desired level, whereupon the valve $g$ will be closed by the float $c$ and the valve $g$ opened, which permits the water from the septic tank to flow onto the filter-bed B' and gradually fill up the collecting-tank C'. The floats $c\ c'$ and valves $g\ g'$ may operate in unison, and as one float, as $c$, is being lifted by the water accumulating in the tank C the valve $g$ is being closed and the valve $g'$ opened. The filtered water in the tanks C C' flows through the siphons D D' into the air-chamber 4 and upon the filter-beds E, down through which it passes into the collecting-chamber F, from which it is drawn off as required. When a desired amount of filtered water has been collected in the chamber F, the valve $b$ in the supply-pipe $a$ is automatically closed by the float $f$, rod 30, and lever 32, attached to the stem of the valve $b$. The rod 30 works freely through a sleeve or pipe 35.

The filtering apparatus shown in Fig. 1 is portable and is designed for domestic purposes, and it may and preferably will be ventilated, as will now be described.

The removable cover T is provided with an air-inlet pipe $h$, which admits air to the chamber 2, and from this chamber a pipe 1 conducts the air into the chamber 4, from which it is prevented returning through the pipe 1 by a check-valve $n$. From the chamber 4 pipes 40 conduct the air into the collecting-tanks C C', from which it passes through pipe $i$. The pipes 40 are provided with check-valves $j$ and the pipe $i$ with a check-valve 51, by which air is prevented from passing in a reverse direction through said pipes. A circulation of air through the apparatus is obtained by the filtered water in the tanks C C', discharging through the siphons D D' into the chamber 4. When the water rushes out of the collecting-tanks C C', the only air which can be obtained to fill the vacuum caused by the fall of water is through the inlet-pipe $h$, tube or pipe 1, up through the pipes 40, thus forcing fresh air into the top of the filter-beds B B', into the air-chamber 4, and also into the collecting-tanks C C'. The air is forced out of the collecting-tanks through the pipe $i$ by the filtered water as it rises in said tanks.

In the operation of the apparatus shown in Fig. 1 any organisms or germ life in the water and organic impurities will be collected in the septic tank A. By the intermittent downward filtration through the filter-bed B another set of bacteria is cultivated in said filter-bed, which are maintained by the supply of fresh air delivered to them and which largely disappear before the effluent is collected in the tanks C C'. If, however, any germs escape, they are received in the large filters E, thus absolutely destroying all germ life and organic impurities, so that the water collected in the chamber or tank F is chemically pure and free from all cases of organic impurities. The filter-beds E rest on a porous support 60 and may be covered by a screen $m$, and the filter-beds B may also be covered by suitable screens. The weirs $d$ extend down into the tank A, so that the water is drawn off from said tank at a point considerably below the surface of the water therein.

The apparatus above described is adapted for domestic purposes in small houses; but the principle of the same applies equally as well to the purification of water intended for use in large houses, hotels, small villages, towns, or cities.

Figure 4:
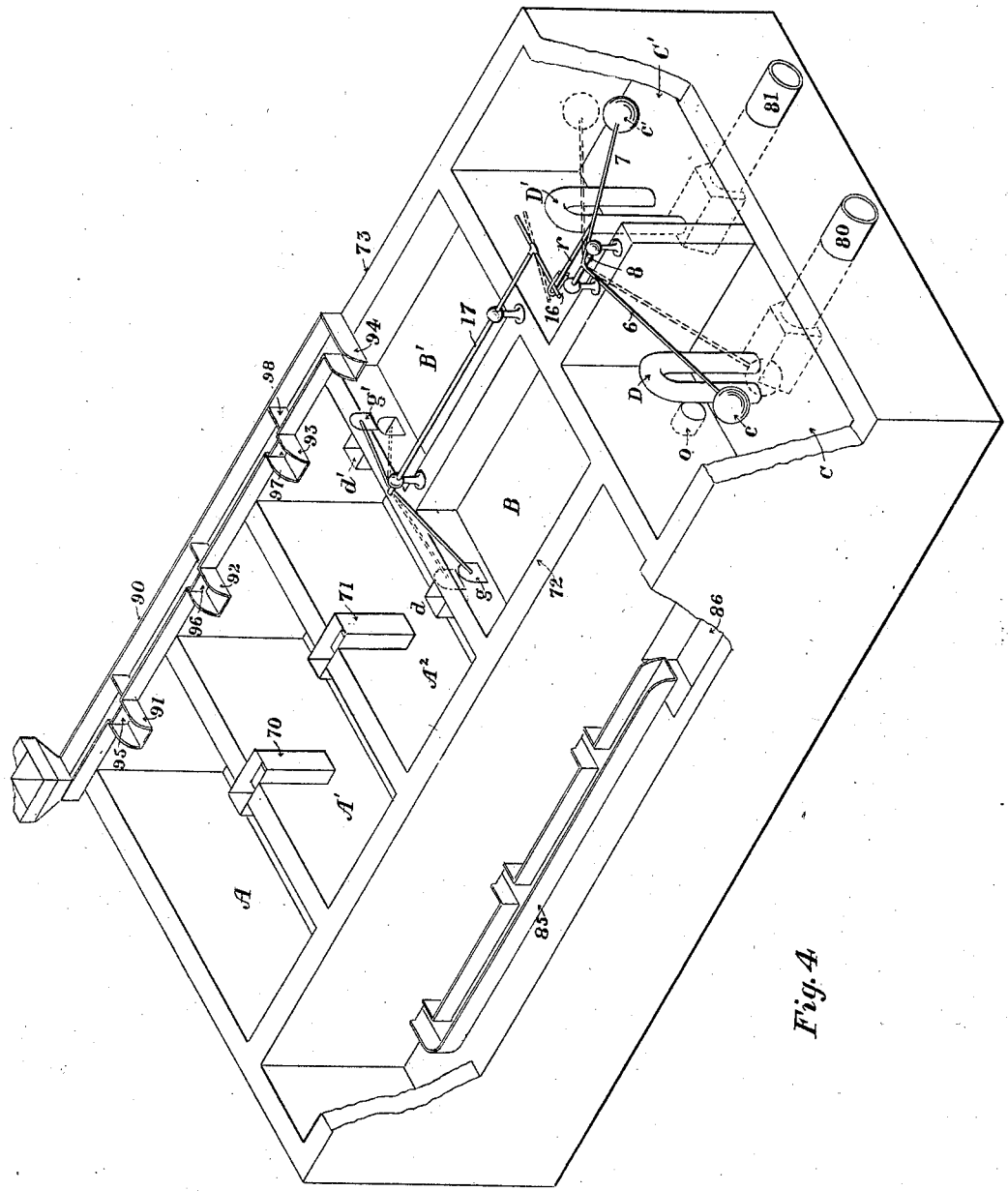

In Fig. 4 I have shown a modified construction embodying the essential features shown in Fig. 1 and which is designed for the purification of sewage, especially of villages, towns, and cities. In the apparatus represented in Fig. 4 three septic tanks A A' A² are shown connected by weirs 70 71, and two chambers 72 73, containing filter-beds B B' and connected with the tank A² by weirs $d\ d'$, controlled by gates or valves $g\ g'$, alternately opened and closed by floats $c\ c'$ in collecting-tanks C C', which are connected with the filter-beds by pipes $o$. The tanks C C' are provided with the siphons D D' and discharge the effluent outside of the apparatus through the outlet-pipes 80 81, which may discharge onto a filter-bed. (Not herein shown, but which is located outside of the apparatus shown in Fig. 4.) The septic tanks A A' A² are provided with suitable outlets for the sludge accumulated in said tanks, which communicate with a discharge-pipe 85, leading, as shown, to an opening 86 in the bottom of the structure outside of the septic tanks. The floats $c\ c'$ are connected to the valves or gates $g\ g'$ by a mechanism similar to that shown in Fig. 1 and consisting of the arms 6 7, rock-shaft 8, and arm $r$, which engages the arm 16 on the rock-shaft 17, to which the arms 18 19, carrying the gates or valves, are connected. The apparatus shown in Fig. 4 is provided with a supply-pipe 90, having branches 91 92 93, communicating with the septic tanks, and a branch 94, communicating with the filters. The flow of sewage through the branch pipes 91 92 93 may be controlled by gates or valves 95 96 97 and through the branch pipe 94 by a gate or valve 98. The action of the septic tanks and of the filters is the same as that above described with relation to the apparatus shown in Fig. 1.

I claim—

1. In an apparatus of the character described, the combination with a septic tank provided with a liquid-outlet, of a filter upon which the liquid is discharged from said outlet, a collecting tank or chamber communicating with said filter for the reception of the filtered liquid, a gate or valve coöperating with the outlet of the septic tank, and means in the collecting-tank to automatically operate said gate or valve, substantially as described.

2. In an apparatus of the character described, the combination with a septic tank provided with separate liquid-outlets, separate filters coöperating with said outlets, separate collecting tanks or chambers connected with said filters for the reception of filtered liquid, separate gates or valves coöperating with the outlets for the septic tanks, and floats in said collecting-chambers connected together and to said valves to alternately open and close the outlets for the septic tanks, substantially as described.

3. In an apparatus of the character described, a casing provided within it with a septic tank, a collecting-chamber, a filter intermediate of said collecting-chamber and said septic tank, a second filter located below the first-mentioned filter and into which the liquid from the collecting-tank is discharged, and a collecting-chamber communicating with said second filter, substantially as described.

4. In an apparatus of the character described, a casing provided with a septic tank having a liquid-supply provided with a valve, a filter connected with said septic tank, a collecting-chamber into which the filtered liquid discharges, a second filter upon which the liquid in the collecting-tank discharges, a second collecting-chamber for the filtered water flowing from the second filter, and a float in said second collecting-chamber connected with the liquid-supply valve for the septic tank, substantially as described.

5. In an apparatus of the character described, a casing provided with a septic tank having a liquid-overflow, a filter upon which the water from the septic tank discharges from said overflow, a collecting-tank connected with said filter for the reception of filtered water, a valve coöperating with the overflow from the septic tank, and a float in the collecting-tank connected to said valve to automatically open and close the same, substantially as described.

6. In an apparatus of the character described, a casing provided with a septic tank having a liquid-supply provided with a valve, and an overflow from said tank, a filter upon which said overflow discharges, a collecting-tank for filtered water, and a float in said collecting-tank connected to the supply-valve to automatically operate the same, substantially as described.

7. In an apparatus of the character described, a casing provided with a septic tank having a liquid-supply provided with a valve, and having separated overflows from said tank, separate filters upon which said overflows discharge, separate collecting chambers or tanks communicating with said filters, valves controlling said overflows, floats in the collecting-tanks connected to said overflow-valves to alternately operate the same, a second collecting-tank for filtered liquid, and a float in said second collecting-tank connected to said supply-valve to operate, substantially as described.

8. In an apparatus of the character described, a casing provided with a septic tank having a liquid-supply provided with a valve, and having separate overflows from said tank, separate filters upon which said overflows discharge, separate collecting chambers or tanks communicating with said filters, valves controlling said overflows, floats in the collecting-tanks connected to said overflow-valves to alternately operate the same, a second filter onto which the liquid from the collecting-tanks is discharged, a collecting-chamber connected with the said second filter, a float in said second collecting-chamber connected to said supply-valve to operate, substantially as described.

9. In an apparatus of the character described, a casing provided with a septic tank having a liquid-supply provided with a valve, and having separate overflows from said tank, separate filters upon which said overflows discharge, separate collecting chambers or tanks communicating with said filters, valves controlling said overflows, floats in the collecting-tanks connected to said overflow-valves to alternately operate the same, a second filter-bed onto which the liquid from the collecting-tanks is discharged, a collecting-chamber connected with the said second filter, a float in said second collecting-chamber connected to said supply-valve, an air-tube extended through the first-mentioned filter and discharging air onto the second filter, an air-tube extended from the second filter up through the first-mentioned collecting-chamber, valves controlling the passage of air through said tubes, and an air-outlet from said first-mentioned collecting-chamber, substantially as described.

In testimony whereof I have affixed my signature in presence of two witnesses.

JOHN N. McCLINTOCK.

Witnesses:
M. F. HERRING,
A. B. CALL.